United States Patent
Smith et al.

(10) Patent No.: US 7,028,118 B2
(45) Date of Patent: Apr. 11, 2006

(54) MULTI-CHANNEL BUFFERED SERIAL PORT DEBUGGING

(75) Inventors: Patrick J. Smith, Houston, TX (US); Ruben D. Perez, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 387 days.

(21) Appl. No.: 10/256,504

(22) Filed: Sep. 27, 2002

(65) Prior Publication Data

US 2003/0110420 A1 Jun. 12, 2003

Related U.S. Application Data

(60) Provisional application No. 60/340,426, filed on Dec. 12, 2001.

(51) Int. Cl.
*G06F 13/36* (2006.01)

(52) U.S. Cl. ............... 710/113; 710/240; 710/316; 710/317; 710/45; 714/43

(58) Field of Classification Search ........... 710/113, 710/240–244, 100, 305; 711/143
See application file for complete search history.

(56) References Cited

U.S. PATENT DOCUMENTS

| | | | | |
|---|---|---|---|---|
| 5,898,847 A * | 4/1999 | Yoon | ........................... | 710/113 |
| 6,122,688 A * | 9/2000 | Barth et al. | ................. | 710/100 |
| 6,157,989 A * | 12/2000 | Collins et al. | .............. | 711/151 |
| 6,463,494 B1 * | 10/2002 | Morriss et al. | ............. | 710/305 |
| 6,757,244 B1 * | 6/2004 | Redman | ...................... | 370/227 |
| 6,789,140 B1 * | 9/2004 | Kotani et al. | .................. | 710/20 |
| 6,799,234 B1 * | 9/2004 | Moon et al. | ................. | 710/110 |
| 6,813,654 B1 * | 11/2004 | Ishibashi | ..................... | 710/36 |
| 2002/0181475 A1 * | 12/2002 | Dove et al. | ................. | 370/398 |

* cited by examiner

*Primary Examiner*—Rehana Perveen
*Assistant Examiner*—Kim T. Huynh
(74) *Attorney, Agent, or Firm*—Robert D. Marshall, Jr.; W. James Brady, III; Frederick J. Telecky, Jr.

(57) ABSTRACT

In digital signal processors serial data is passed in out and of the chip in a time division multiplexed (TDM) fashion. The TDM stream consists of many independent channels of serial data. The complexity of generating interleaved TDM serial data from multiple sources particularly in the case of multi-processor systems. This process is normally driven by a program resident on each processor. The proper sequencing of the TDM serial stream must be tested prior to making the multi-processor device ready for its application. This invention describes the use of minimal added hardware and a single output pin allowing the test and debug of program errors or device malfunctions in output serial data.

8 Claims, 3 Drawing Sheets

MULTI-CHANNEL BUFFERED SERIAL PORT DEBUGGING

This application claims priority under 35 USC §119(e)(1) of Provisional Application No. 60/340,426, filed Dec. 12, 2001.

TECHNICAL FIELD OF THE INVENTION

The technical field of this invention is buffered serial ports.

BACKGROUND OF THE INVENTION

Digital signal processors (DSP), designed for a range of applications and having a variety of architectures, commonly employ a number of peripheral device functions. FIG. 1 illustrates a conventional DSP architecture. DSP core 101 communicates to memory 102 using bus 100. Bus 100 is a complex bus that includes program read, data read and data write busses. A separate peripheral bus M bus 112 allows for data transfers among on-chip memory 102, multi-channel buffered serial ports (MCBSP) 107 and host port interface (HPI) 115. Direct memory access (DMA) controller 105 manages these data transfers. Multi-channel buffered serial ports 107 also have a direct communication link with DSP core 101 via bus 110 and with memory 102 via M bus 112. Configuration bus 103 enables DSP core 101 access to configure peripherals such as general purpose timers 104, watchdog timer (WDT) 106, general purpose I/O 108, DMA controller 105, and most importantly for this invention, multi-channel buffered serial ports 107.

FIG. 2 illustrates the construction of multi-channel buffered serial ports (McBSP) 107. McBSP 107 consists of a data path and a control path connected to external devices by seven pins. The external interface signal pins are listed in Table 1. Note: type I is an input; type O is an output; and type Hi-Z has a high impedance when not in use.

TABLE 1

| Pin | Type | Description |
| --- | --- | --- |
| CLKR | I/O/Hi-Z | Receive Clock |
| CLLX | I/O/Hi-Z | Transmit Clock |
| CLKS | I | External Clock |
| DR | I | Received Serial Data |
| DX | O/Hi-Z | Transmitted Serial Data |
| FSR | I/O/Hi-Z | Receive Frame Synchronization |
| FSX | I/O/Hi-Z | Transmit Frame Synchronization |

McBSP 107 communicates with interfacing devices via data transmit (DX) pin 210 for transmit operations and data receive (DR) pin 211 for receive operations. Control information in the form of clocking and frame synchronization is communicated via CLKX 213, CLKR 214, FSX 215 and FSR 216. DSP core 101 communicates with McBSP 107 through 16-bit-wide control registers accessible via the 16-bit or 32-bit internal peripheral bus 232.

DSP core 101 or DMA controller 105 reads the received data from the data receive registers (DRR[1,2]) 224 and writes the data to be transmitted to the data transmit registers (DXR[1,2]) 225. Data written to DXR[1,2] is shifted out to DX pin 210 via the compress block 231 and the transmit shift register XSR[1,2] 227.

Similarly, receive data on DR pin 211 is shifted into the receive shift registers RSR[1,2] 226 and copied into the receive buffer registers RBR[1,2] 228. Data in RBR[1,2] 228 is then passed through expander block 230 and copied into data receive registers DRR[1,2] 224. DDR[1,2] 224 can be read by DSP core 101 or DMA controller 105. The separate datapaths for transmit and receive allow for simultaneous movement of internal and external data communications.

Table 2 lists the datapath registers 224 to 228 just described and the control registers 201 to 208 accessible to DSP core 101 to configure the control mechanism of McBSP 107.

TABLE 2

| Acronym | Register Name |
| --- | --- |
| Datapath Registers | |
| RBR[1, 2] | Receive Buffer Registers |
| RSR[1, 2] | Receive Shift Registers |
| XSR[1, 2] | Transmit Shift Registers |
| DRR | Data Receive Register |
| DXR | Data Transmit Register |
| Control Registers | |
| SPCR | Serial Port Control Register |
| RCR | Receive Control Register |
| XCR | Transmit Control Register |
| SRGR | Sample Rate Generator Register |
| MCR | Multi-Channel Register |
| RCER | Receive Channel Enable Register |
| XCER | Transmit Channel Enable Register |
| PCR | Pin Control Register |

Control block 233 consists of internal clock generation, frame synchronization signal generation 238, control block 234, multi-channel selection control logic 236 and channel control logic 237. Control block 233 sends notification of important events to the cognizant subsystem (DSP core 101 and DMA controller 105) via the two interrupt signals 218 and 219. These signals are collectively referred to as bundle 240. Four event signals REVT 220, XEVT 221, REVTA 222 and XEVTA 223 convey synchronization to local DMA controller 105. These signals are collectively referred to as bundle 241. Table 3 describes these signals.

TABLE 3

| Interrupt Name | Description |
| --- | --- |
| RINT | Receive Interrupt to CPU |
| XINT | Transmit Interrupt to CPU |
| REVT | Receive Synchronization Event to DMA |
| XEVT | Transmit Synchronization Event to DMA |
| REVTA | Receive Synchronization Event A to DMA |
| XEVTA | Transmit Synchronization Event A to DMA |

The most recent version of McBSP 107 includes the following enhancements to earlier designs. The new version supports up to 512 channels with individual enable/disable control through PDMA. The corresponding maximum serial clock rate equals the maximum clock rate at one-half of the module clock rate in multi-channel operation. The new version supports up to 512 channels with individual μ-Law and A-Law companding control capability. The new version presents time slot identification to DMA controller 105 and DSP core 101 whenever it asserts a request corresponding to either a transmit event or a receive event. The time slot buffering is incorporated into DMA controller 105. The new version supports super frame synchronization.

SUMMARY OF THE INVENTION

In most digital signal processors serial data is passed in out and of the integrated in a time division multiplexed (TDM) fashion. The TDM stream data is built up from 8-bit or 16 bit data that is serialized and consists of many independent channels of serial data. These channels are time division multiplexed and transmitted or received over one set of data lines. The DSP module that implements this protocol is the multi-channel buffered serial port (McBSP).

Generating interleaved TDM serial data from multiple sources is complex, particularly in the case of multi-processor systems. This process is normally driven by a program resident on each processor. The proper sequencing of the TDM serial stream must be tested prior to making the multi-processor device ready for its application. This involves testing the program simultaneously with the device, and very possibly an error in TDM serial stream sequencing could result from the program as well as the device hardware.

This invention adds a minimal amount of hardware to the multi-processor which detects contention by two or more processors and reports the contention on an output pin labeled the McBSP Debug pin. This technique provides a means for tracking channel contentions and identifying their root cause and provides a simple, low cost means of solving channel contention problems.

BRIEF DESCRIPTION OF THE DRAWINGS

These and other aspects of this invention are illustrated in the drawings, in which.

DETAILED DESCRIPTION OF PREFERRED EMBODIMENTS

In most digital signal processors serial data is passed in out and of the chip in a time division multiplexed (TDM) fashion. The TDM stream consists of 8 or 16 bit data that is serialized. The TDM stream consists of many independent channels of serial data. These channels are time division multiplexed and transmitted or received over one set of data lines. The DSP module that implements this protocol is the multi-channel buffered serial port (McBSP).

The McBSP from a single DSP is capable of TDM processing up to 512 channels. In typical multi-processor DSP systems, the integrated circuit contains multiple McBSPs. While each individual DSP core could process all 512 channels, typically each DSP core processes only a subset of the 512, because of processor throughput considerations. Unused received channels are ignored. Unused transmit channels have the output driver disabled.

Typically the transmit ports of all McBSPs are tied together, and the receive ports of all McBSPs are tied together. In this fashion three or more individual McBSPs can be used to service one TDM stream.

Because of the complexity of generating interleaved TDM serial data from multiple sources, this operation is normally driven by a program resident on the processor. The proper sequencing of the TDM serial stream must be tested prior to making the device ready for its application. This involves testing the driving program simultaneously with the device, and very possibly an error in TDM serial stream sequencing could result from the program as well as the device hardware.

Figure 3:
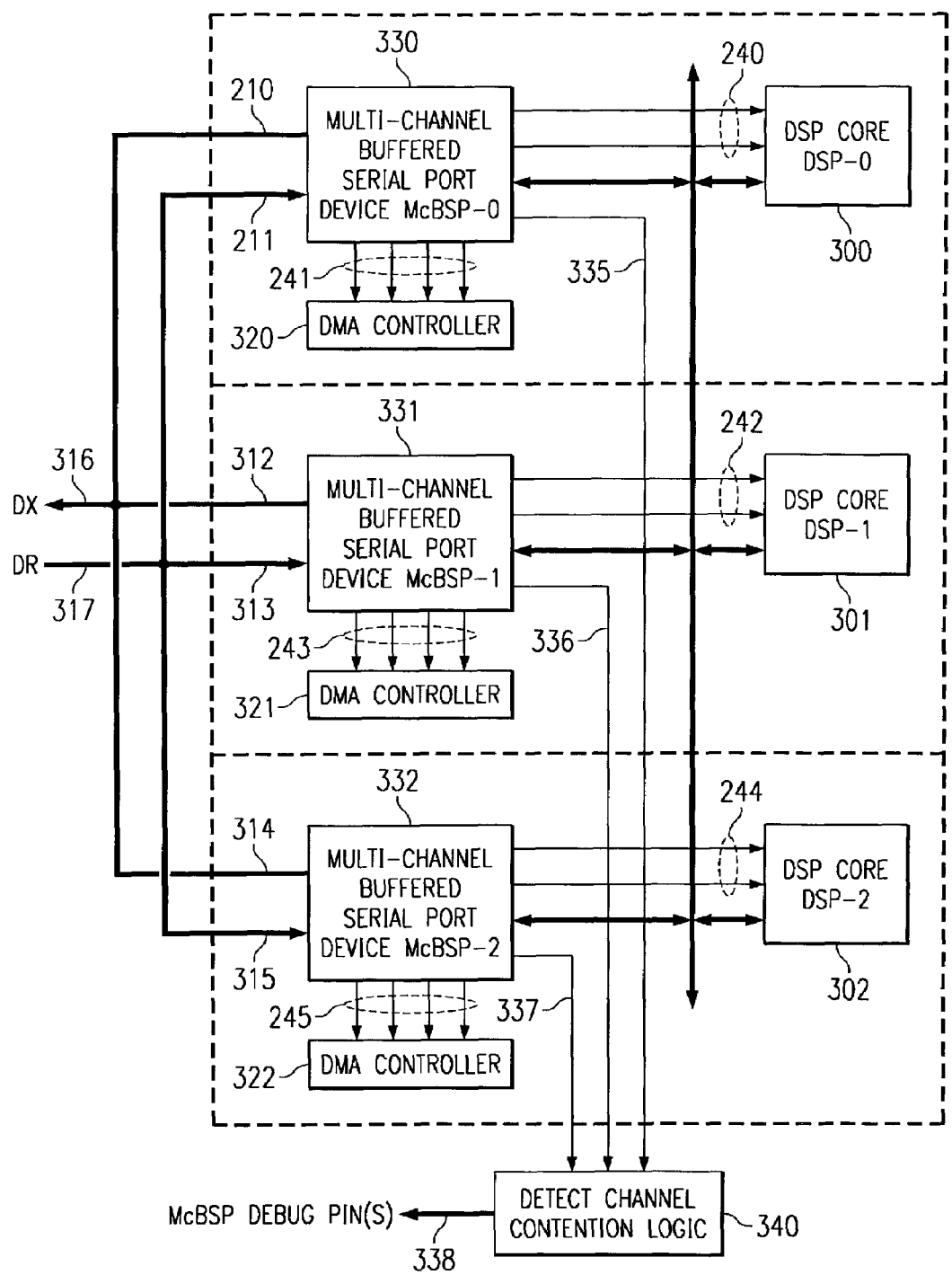
FIG. 3 illustrates the block diagram of a three DSP multi-processor system highlighting the connection of multi-channel buffered serial ports from each subsystem.

FIG. 3 illustrates the block diagram of a multi-processor system highlighting the interconnection of three DSP cores 300, 301 and 303 each having respective separate McBSP serial ports 330, 331 and 332. Subsystem 0 includes DSP core 300, MCBSP 330 and DMA controller 320. Subsystem 1 has DSP core 301, McBSP 331 and DMA controller 321. Subsystem 2 has DSP core 302, McBSP 332 and DMA controller 322. Each McBSP 330, 331 and 332 outputs respective interrupt signals 240, 242 and 244 to its corresponding DSP core 301, 302 or 303 and synchronization event signals to its corresponding DMA controller 320, 321 or 322. The synchronization events signals are 241, 243, and 245 for subsystems 0, 1, and 2 respectively.

Figure 1:
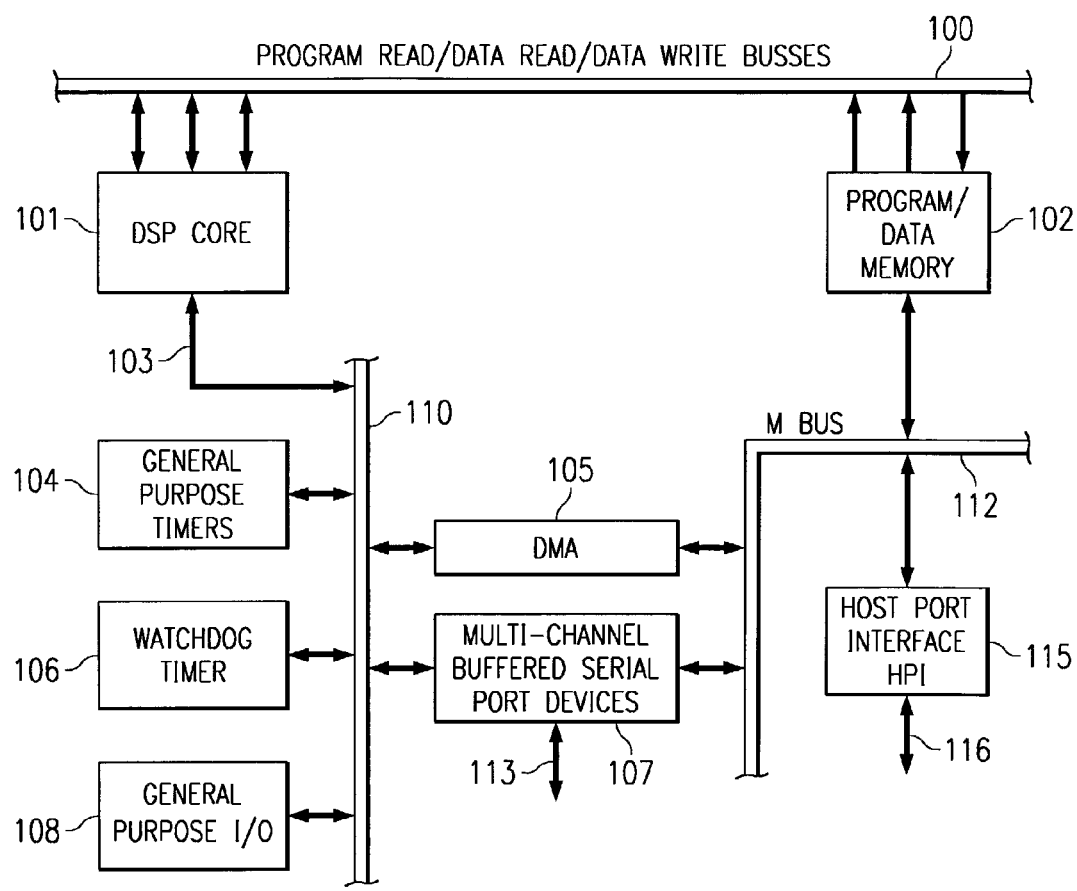
FIG. 1 illustrates the individual functional blocks of a single DSP subsystem used in a multi-processor device.
Figure 2:
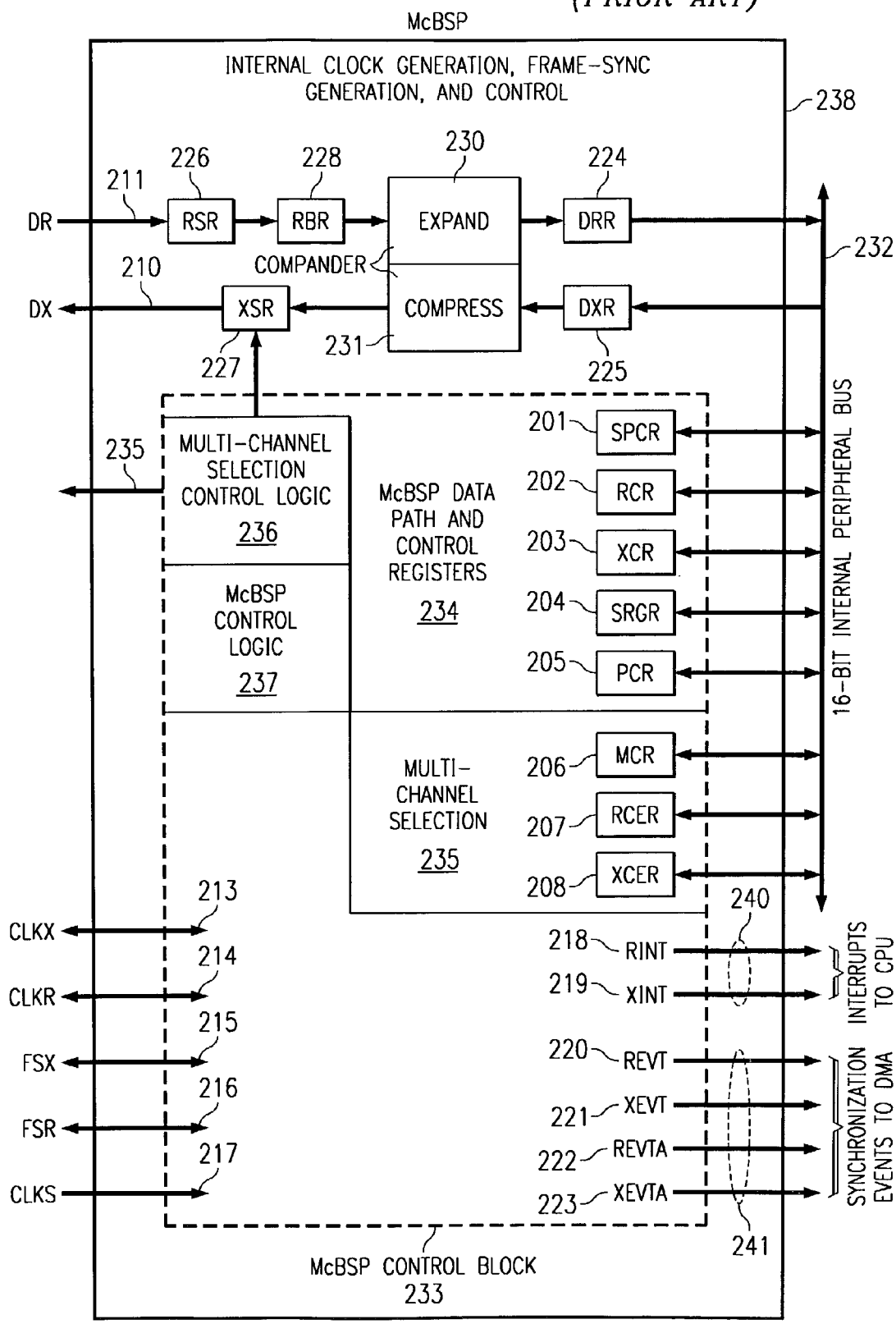
FIG. 2 illustrates the block diagram of the multi-channel buffered serial port hardware for a single DSP.

The transmit outputs for the three McBSP are 210, 312 and 314 for subsystems 0, 1, and 2 respectively. The receive inputs for the three McBSP are 211, 313, and 315 for subsystems 0, 1, and 2 respectively. The three transmit outputs are wired together to form composite transmit output DX 316. The three receive inputs are wired together to form the composite DR input 317. Multi-channel selection control logic 236 illustrated in FIG. 2 determines which output is active on a given cycle and disables the other two outputs via lines 235.

The TDM output serial data stream can accommodate 512 channels for each of the three DSP cores 300, 301 and 302. In actual applications, each DSP core 300, 301 and 302 transmits only a portion, usually a small fraction, of these total possible channels. The following example illustrates a typical application. Each subsystem has 32 or 64 channels active. DSP core 300 and McBSP 330 process 32 channels, channels 0 to 31. DSP core 301 and McBSP 331 process 32 channels, channels 31 to 63. DSP core 302 and McBSP 332 process 64 channels, channels 64 to 128.

The device programming required to properly interleave this serial information in a prescribed time sequence is complex and frequently debugging for program errors is a necessity. This invention involves the use of three signals 335, 336, and 337 from the three respective McBSP 330, 331 and 332, which signify channel status. These signals are passed to the detect channel contention logic 340. If more than one McBSP 330, 331 and 332 requests that its output be activated on a given channel time slot, detect channel contention logic 340 responds by asserting a flag at McBSP debug output pin 338. In accordance with the time division multiplex nature of the data channels, the flag at McBSP debug output pin 338 is active only during the time slot of a data channel experiencing contention. A simple extension of the logic would allow the more exact description of several possible contentions to be passed to McBSP output pin 338. For example the specific two outputs in contention could be reported. A sequence of, say eight McBSP output states (not all ones or not all zeros) could be passed to the McBSP output in another embodiment of the invention.

Thus the multi-processor device is tested along with its program designed to drive the McBSP in the desired sequence. If a channel contention is detected, this is an operating condition in which McBSP output serial data would be corrupted. The test suffering the channel contention would then be noted by a test machine output display. The test must be put in a re-cycle mode on the test machine and the signal patterns of the contention event be examined to determine the root cause of the failure.

What is claimed is:

1. A data port comprising:

a plurality of data lines for data transfer;

a plurality of data transfer units, each connected to said plurality of data lines, each data transfer unit capable of independently transferring serial data on any of said plurality of data lines; and a contention logic detector connected to said plurality of data transfer units and having a contention output pin, said contention logic detector generating an active signal on said contention output pin when two or more of said plurality of data transfer units attempt to initiate transfer data on the same data line and generating an inactive signal on said contention output pin when no more than one of said plurality of data transfer units attempts to initiate transfer data on the same data line.

2. The data port of claim 1, wherein:

said contention logic detector further includes additional contention output pins and further generates an indication on said additional contention output pins of the identity of said two or more data transfer units of said plurality of data transfer units attempting to initiate transfer data on the same data line.

3. The data port of claim 1, wherein:

said plurality of data transfer units includes at least one central processing unit.

4. The data port of claim 1, wherein:

said plurality of data transfer units includes at least one direct memory access unit associated with a central processing unit.

5. A data port comprising:

a plurality of data lines for data transfer;

a plurality of data transfer units, each connected to said plurality of data lines, each data transfer unit capable of independently transferring serial data on any of said plurality of data lines in any of a plurality of time division multiplex time slots; and a contention logic detector connected to said plurality of data transfer units and having a contention output pin, said contention logic detector generating an active signal on said contention output pin when two or more of said plurality of data transfer units attempts to initiate transfer data on the same data line during the same time division multiplex time slot and generating an inactive signal on said contention output pin when no more than one of said plurality of data transfer units attempts to initiate transfer data on the same data line during the same time division multiplex time slot.

6. The data port of claim 5, wherein:

said contention logic detector further includes additional contention output pins and further generates an indication on said additional contention output pins of the identity of said two or more data transfer units of said plurality of data transfer units attempting to initiate transfer data on the same data line during the same time division multiplex time slot.

7. The data port of claim 5, wherein:

said plurality of data transfer units includes at least one central processing unit.

8. The data port of claim 5, wherein:

said plurality of data transfer units includes at least one direct memory access unit associated with a central processing unit.

* * * * *